(12) United States Patent
Kwan et al.

(10) Patent No.: US 7,823,023 B2
(45) Date of Patent: Oct. 26, 2010

(54) TEST FRAMEWORK FOR TESTING AN APPLICATION

(75) Inventors: Nang Kon Kwan, Mountain View, CA (US); Orla Hegarty, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 606 days.

(21) Appl. No.: 11/678,982

(22) Filed: Feb. 26, 2007

(65) Prior Publication Data

US 2008/0209275 A1      Aug. 28, 2008

(51) Int. Cl.
*G06F 11/00* (2006.01)
(52) U.S. Cl. ....................................................... 714/38
(58) Field of Classification Search ..................... 714/38
See application file for complete search history.

(56) References Cited

U.S. PATENT DOCUMENTS

| | | | |
|---|---|---|---|
| 6,601,018 B1 | 7/2003 | Logan | |
| 2002/0065943 A1* | 5/2002 | Czajkowski et al. | ........ 709/310 |
| 2004/0003068 A1 | 1/2004 | Boldman et al. | |
| 2005/0223362 A1* | 10/2005 | Whitlock et al. | ............ 717/126 |
| 2006/0015852 A1* | 1/2006 | Parkinson et al. | ........... 717/126 |
| 2007/0185984 A1* | 8/2007 | Roth | .......................... 709/223 |
| 2007/0283314 A1* | 12/2007 | Browning et al. | ........... 717/100 |

OTHER PUBLICATIONS

TETware White Paper: Drudge, http://tetworks.opengroup.org/Wpapers/drudge.htm#Reporting, 2006, Accessed Oct. 2, 2006.
Distributed TETware, http://tetworks.opengroup.org/Products/distributed_tetware.htm, 2006, Accessed Oct. 2, 2006.
TETware White Paper: Managing Distributed Testing, http://tetworks.opengroup.org/Wpapers/distributed_whitepaper.htm, 2006, Accessed Oct. 2, 2006.

* cited by examiner

*Primary Examiner*—Bryce P Bonzo
(74) *Attorney, Agent, or Firm*—MH2 Technology Law Group LLP

(57) ABSTRACT

A device, method and/or computer-readable medium for testing an application within a test framework includes a framework controller associated with the test framework installed on a master device and a test driver associated with the test framework installed on one or more client devices. The master device is connected to the one or more client devices and a virtual machine (VM) module is installed on each of the one or more client devices. VMs can be created on the client devices and the application is installed on at least one of the VMs. The application is executed on the VMs according to a test scenario file. The framework controller collects data to generate an output result.

19 Claims, 14 Drawing Sheets

File name: DIRECTORY-TEST-PLAN1.txt

TEST CASE #1
Create VM on client device 1 with 500 MB disk space and call it VM1
Install Linux Operating System on VM1
Install Directory Server and call it DS1 in VM1
Create VM on client device 2, and call it VM2
Install Windows 2003 operating system on client device VM2
Install test client #1 on VM2
Use test client #1 and create 1000 users in the DS1

File name: CM-TEST-PLAN1.txt

TEST CASE #2
Create VM on client device 1 with 500 MB disk space and call it VM1
Install Linux Operating System on VM1
Install Certificate Manager and call it CM1 in VM1
CM1 creates 1000 certificates
Create VM on client device 2, and call it VM2
Install Windows 2003 operating system on client device VM2
Install email application on VM2
Use email application to send email to a user having a certificate in CM1

300

TEST FRAMEWORK FOR TESTING AN APPLICATION

DESCRIPTION OF THE INVENTION

1. Field of the Invention

The present invention relates generally to methods and systems for testing software applications to be run in an inter-machine environment.

2. Background of the Invention

An inter-machine environment such as a computing network infrastructure which includes a plurality of computing devices connected to each other directly by, for example, a wireless or wired connection, or indirectly by, for example, a local area network (LAN), wide area network (WAN) or the Internet. The network infrastructure can have one or more of a vast number of network models such as, for example, a centralized or distributed network in which one or more client devices are connected to a server to access resources such as memory or particular applications, or a peer-to-peer network in which any client device can function as the server. The computing devices in the network infrastructure may not all have the same configuration. For example, some of the computing devices can have different hardware configurations or operating systems.

A software application intended to be executed on one or more computing devices in a network infrastructure must execute properly in all of the computing devices in the network, regardless of the nature of the network connection, the hardware configuration or operating system type of the computing devices. Further, software applications that help facilitate the network infrastructure itself such as, for example, an oracle, or software applications that interact with client programs to take advantage of the network infrastructure such as, for example, email, network security, etc. must not only execute properly but perform at a high quality of service (QOS) level.

Therefore, it is necessary to test the operability of a software application in a framework, harness or execution environment that provides a network infrastructure of diverse computing devices. In addition, it is necessary to test a QOS of the software application and perform stress testing over diverse computing devices. The same concern is applicable to software applications intended to be run across multiple operating systems in a single computing device.

Software applications are conventionally tested within a test framework in which computing devices referred to here as client devices are connected to a master device. Initially, client devices having a predetermined configuration in accordance with a test scenario are selected. The software application to be tested and any client applications are then installed on the client devices. A test scenario written in, for example, a high level language is input into a test framework controller at the master device to thereby control operation of the software application and client applications at the client devices and generate an output result based upon the software application performance. A software engineer can change the test scenario and continuously monitor the results at the master device to test a QOS of the software application and perform stress testing over diverse client devices.

However, the conventional approach requires a number of client devices having the configuration specified in the test scenario. It would be desirable to have a test framework in which particular client devices having the needed configuration were automatically generated. It would be further desirable for the test framework to be able to read test scenarios written in a low level language.

While a general background including problems in the art are described hereinabove, with occasional reference to related art or general concepts associated with the present invention, the above description is not intended to be limiting since the primary features of the present invention will be set forth in the description which follows. Some aspects of the present invention not specifically described herein may become obvious after a review of the attendant description, or may be learned by practice of the invention. Accordingly, it is to be understood that both the foregoing general description and the following detailed description are exemplary and explanatory only in nature and are not restrictive of the scope or applicability of the present invention.

BRIEF DESCRIPTION OF THE DRAWINGS

The accompanying drawings, which are incorporated in and constitute a part of this specification, illustrate various exemplary embodiments of the invention and together with the description, serve to explain the principles of the invention. In the figures:

FIG. 2A is a diagram illustrating a first exemplary test scenario file;

FIG. 3A is a diagram illustrating a second exemplary test scenario file;

DETAILED DESCRIPTION

Figure 1A:
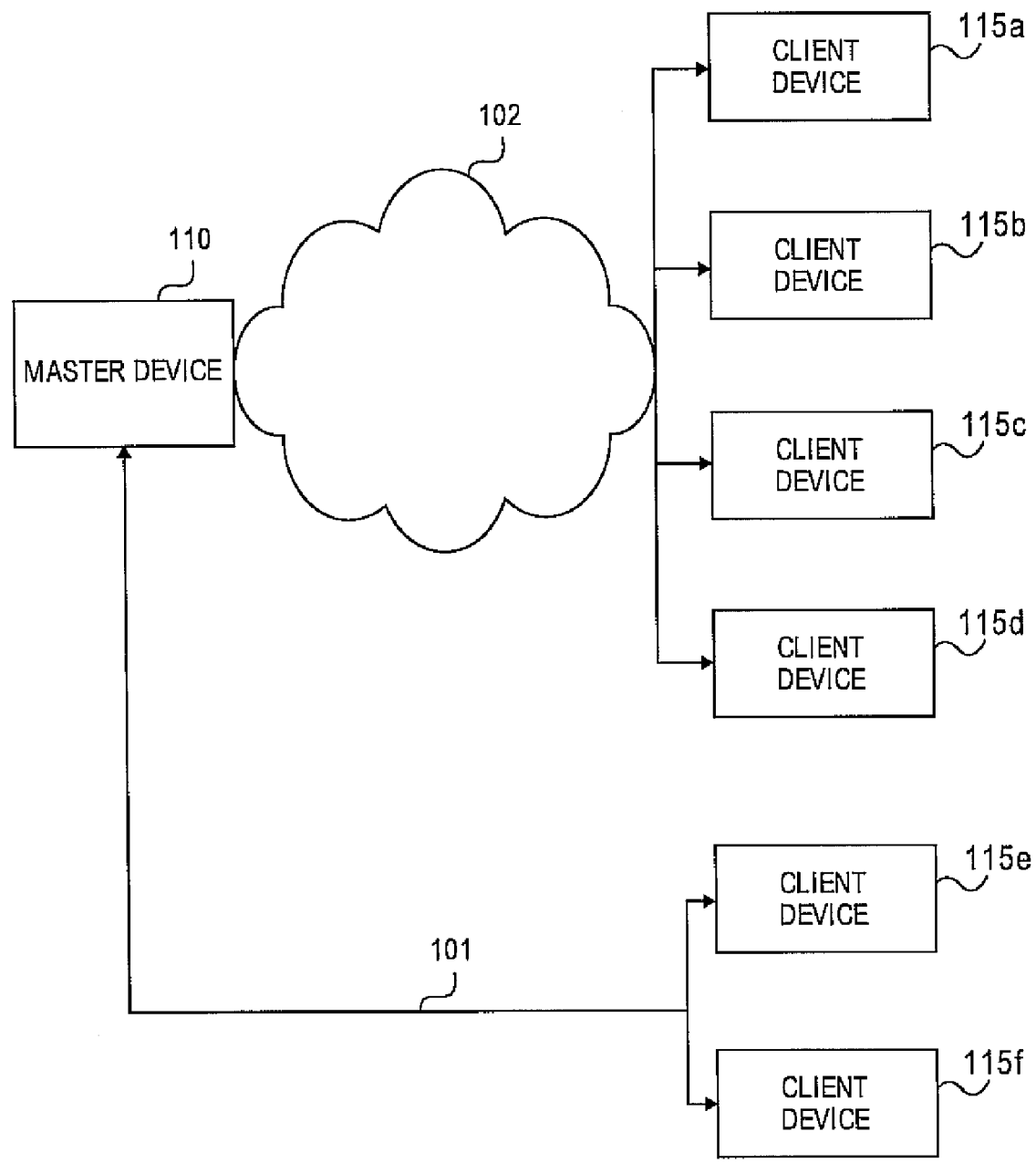
FIG. 1A is a diagram illustrating a simplified and representative inter-machine environment in which a test framework can be implemented according to an embodiment.

Accordingly, one or more embodiments relate generally to a testing automation framework, a master device and plurality of client devices in which the testing automation framework is installed, a method for implementing the testing automation framework, and/or a computer-readable medium on which instructions for implementing the testing automation framework are stored. The testing automation framework is for testing software applications in, for example, an inter-machine environment. The inter-machine environment can include the plurality of client devices having a virtual machine module installed thereon. The testing automation framework, which will be referred to here as a test framework, is installed in a master device and one or more, generally a plurality of, client devices connected to the master device.

The test framework can control the client devices to automatically create virtual machines (VMs) on the plurality of client devices, install the software application to be tested, which will be referred to here as an application, and client applications of the application in the VMs as well as testing execution of the application on the VM and collecting data regarding the performance of the application to generate an output result based upon the collected data at the master device. A test scenario file at the master device can specify the client devices on which the virtual machines are created, the application to be installed, and the manner of controlling application execution. Preferably, the test scenario file is a non-coded text file that is input into a framework controller of the test framework.

Other embodiments also provide a processor included in the master device that is configured to generate control signals to thereby create one or more VMs on the client devices, install the application on one of the VMs, and control operation of the VMs according to the test scenario file.

In overview, the present disclosure concerns a test framework for testing software applications in an inter-machine environment. The test framework can be a software application stored on a computer-readable medium that is installed on a master device and one or more client devices connected to the master device.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

As further discussed herein below, various inventive principles and combinations thereof are advantageously employed to provide a test framework for testing a software application.

Reference will now be made in detail to the accompanying drawings. Wherever possible, the same reference numbers will be used throughout the drawings to refer to the same or like parts.

Referring now to FIG. 1A, a simplified and representative inter-machine environment in which the test framework 100 can be implemented will be discussed and described. The inter-machine environment can include a master device 110 that is connected to a plurality of client devices 115a-115f directly and indirectly. In the exemplary inter-machine environment, the master device 110 can have a direct connection 101 with client devices 115e, 115f and an indirect connection with client devices 115a-115e via a network connection 102 such as, for example, a local area network (LAN), wide area network (WAN) or the Internet. The direct and indirect connections can be secure or non-secure, wired or wireless, or even partially wireless and partially wired. Further, the indirect connection can use a communications protocol such as, for example, Transmission Control Protocol/Internet Protocol (TCP/IP) for data communication. In some instances, one or more of the client devices 115a-115f and the master device 110 can exist within the same computer and be connected with a data bus or high speed serial connection or the like. Generally, the client devices 115a-115g are connected to the master device 110 in any manner. The reference numeral 115 and iterations thereof will be used to refer generally to a client device that is connected to the master device 110.

The master device 110 may be a general purpose computer or dedicated computing platform configured to execute the test framework 100 such as, for example, a Linux or Unix box. The client devices 115 can be a personal computer or a workstation including, for example, a 64 bit processor, a 32 bit processor, or a dual-core processor, and a virtual machine (VM) module installed thereon. Exemplary VM modules include a Xen module or a VMWare module.

Figure 1B:
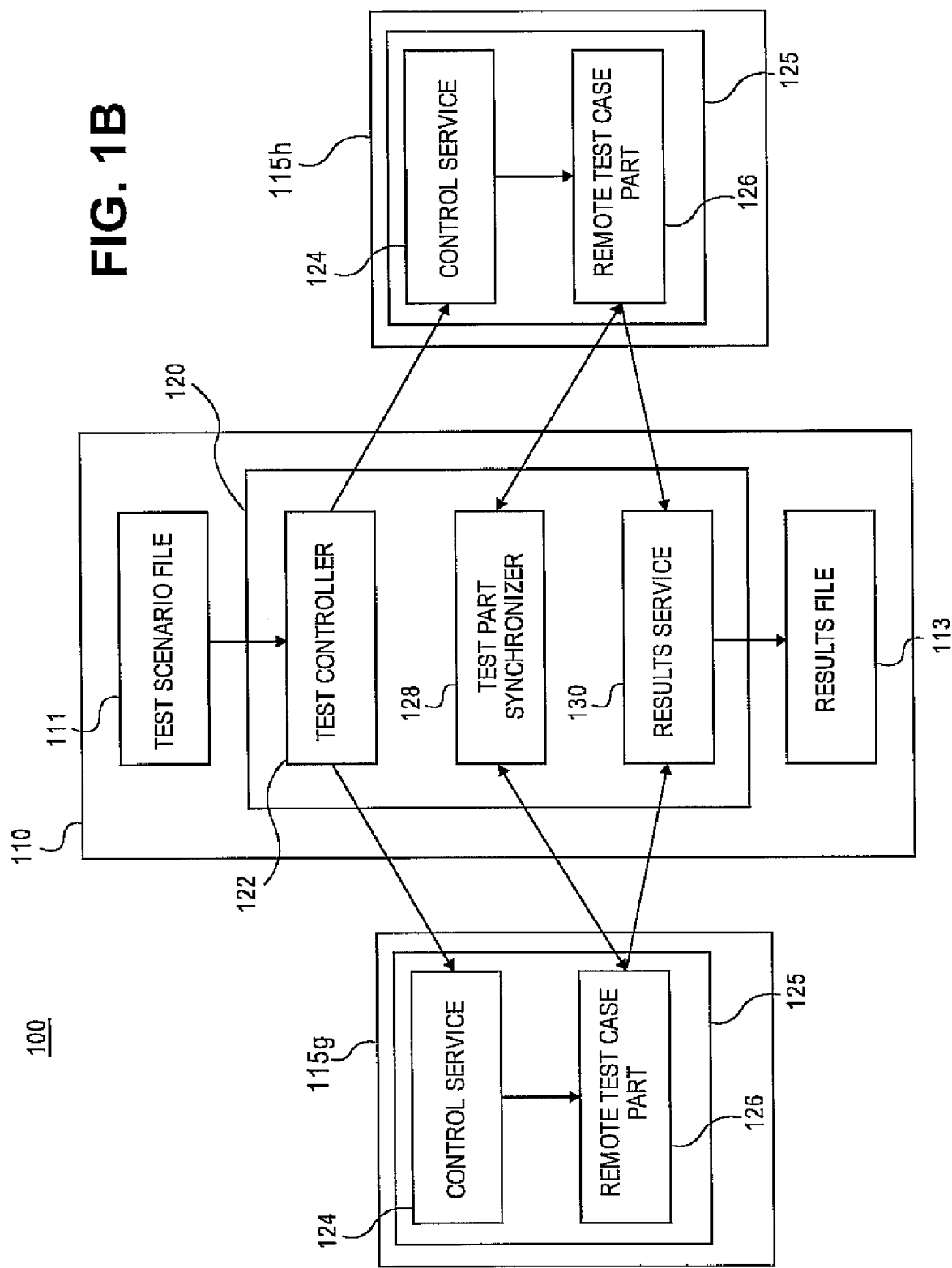
FIG. 1B is an exemplary block diagram of the test framework.

Referring to FIG. 1B, the logical elements of the test framework 100 will be discussed. Generally, the test framework 100 is installed in the master device 110 and each of the plurality of client devices 115. Particularly, as shown, a framework controller 120 associated with the test framework 100 is installed at the master device 110 and a test driver 125 associated with the test framework 100 is installed at each of the client devices 115g, 115h. The test framework 100 is driven by a test scenario file 111 listing all of the test cases, how the test cases are to be executed, and on which particular client devices 115 parts of the test case will be executed. A test controller 122 at the framework controller 120 reads the test scenario file 111 and allocates different parts of the test to a logical element for control service 124 at the test drivers 125 of the client devices 115h, 115g according to the test scenario file 111. It should be appreciated that although only client devices 115h, 115g are shown, the different parts of the test can be allocated to numerous other client devices 115 as well as even a portion of the test being performed locally at the master device 110. It should also be appreciated that the framework controller 120 and test driver 125 can be software modules, processes or the like for implementing high-level or low-level drivers. Further, the drivers can be integrated in the framework or alternatively be provided by third party modules.

The control service 124 at the client devices 115h, 115g performs a portion of the test case allocated to the particular client device by the test controller 122, which will be referred to as a remote test case part 126. For example, here the control service 126 can create a VM on the client device, install the application or an application client to be tested on the VM, and execute the application or application client. In order to ensure that all of the remote test case parts 126 are performed in the correct order specified by the test scenario file 111, a test part synchronizer 128 at the framework controller 120 can synchronize execution of the remote test case parts 126. A logical element for results service 130 at the framework controller 120 collects data from each of the remote test case parts 126 and generates a results file 113 to be displayed at the master device 110. That is, the logical element for results service 130 is a data collection module for collecting data associated with the output result of the remote test case part 126 from the VM.

The test scenario file 111, which is preferably a non-coding format text file, includes a set of primitives that can be read by the test controller 122 for performing operations on the test drivers 125 at the client devices. Particularly, when the test controller 122 reads a CREATE_VM primitive in the test scenario file 111, the test controller 122 sends a control signal to the control service 124 at the client device to create a VM on the client device. For example, if the test scenario file 111 includes a command such as "Create VM on client device 1 and call it VM1," the test controller 122 will send a control signal to the control service 124, which then creates a VM on that particular client device and names the VM as "VM1."

The CREATE_VM primitive can further be associated with a hardware primitive for searching for a particular one of the client devices that has a particular hardware configuration necessary to support operation. For example, if the test scenario file 111 includes a command such as "Create VM of disk space 1 Gbytes and RAM size 1 Gbytes on client device with 64 bit processor and call it VM1," the test controller 122 will search for a particular client device among the client devices 115 having a 64 bit processor, and the control service 124 can then create a VM having disk space of 1 Gbytes and RAM size of 1 Gbytes on that particular client device and name the VM as "VM1."

The test controller 122 sends a control signal to the control service 124 for setting a hardware specification of the VM when it reads a VM_HARDWARE_SPECIFICATION primitive in the test scenario file 113. For example, if the test scenario file 111 includes a command such as "Create VM1 with 256 MB disk space and RAM," the test controller 122 will search for a client device having sufficient capabilities to satisfy these parameters, and the control service 124 can then create the VM on the client device with 256 MB disk space and RAM and name the VM as "VM1."

The test controller 122 sends a control signal to the control service 124 to install a particular operating system specified by a VM_OPERATING_SYSTEM primitive read in the test scenario file 111. The test controller 122 sends a control signal to the control service 124 to install the application to be tested, which is specified by an application primitive in the test scenario file 111. For example, if the test scenario file 111 includes a command such as "Install Linux on VM1 and install Directory Server on VM1," the test controller 122 sends a control signal to the control service 124 to install the Linux operating system on the VM1 of the particular client device and to install the Directory Server as the application to be tested on the VM1.

The test controller 122 at the framework controller 120 sends a control signal to the control service 124 to save a state of the VM to a saved state file when it reads a VM SAVE_VM_STATE primitive in the test scenario file 111. For example, if the test scenario file 111 includes a command such as "save VM1 as VM-2006-07-01," the test controller 122 sends a control signal to the control service 124 to save the present state of all the programs running on VM1 as a saved state file to be saved at the master device 110.

The test controller 122 at the framework controller 120 sends a control signal to the control service 124 of a particular client device to restore the VM to an active state on one of the plurality of client devices when it reads a RESTORE_VM_STATE primitive in the test scenario file 111. For example, if the test scenario file 111 includes a command such as "restore VM 'VM-2006-07-01' to machine XYZ," the test controller 122 sends a control signal to the control service 124 at the named client device "XYZ" to restore the VM1 with the previous state of all the programs running on VM1.

The test controller 122 at the framework controller 120 sends a control signal to the control service 124 to destroy a VM when the test controller 122 reads a DESTROY_VM primitive in the test scenario file 111. For example, if the test scenario file 111 includes a command such as "destroy VM1" the test controller 122 will delete VM1 from memory.

Figure 2B:
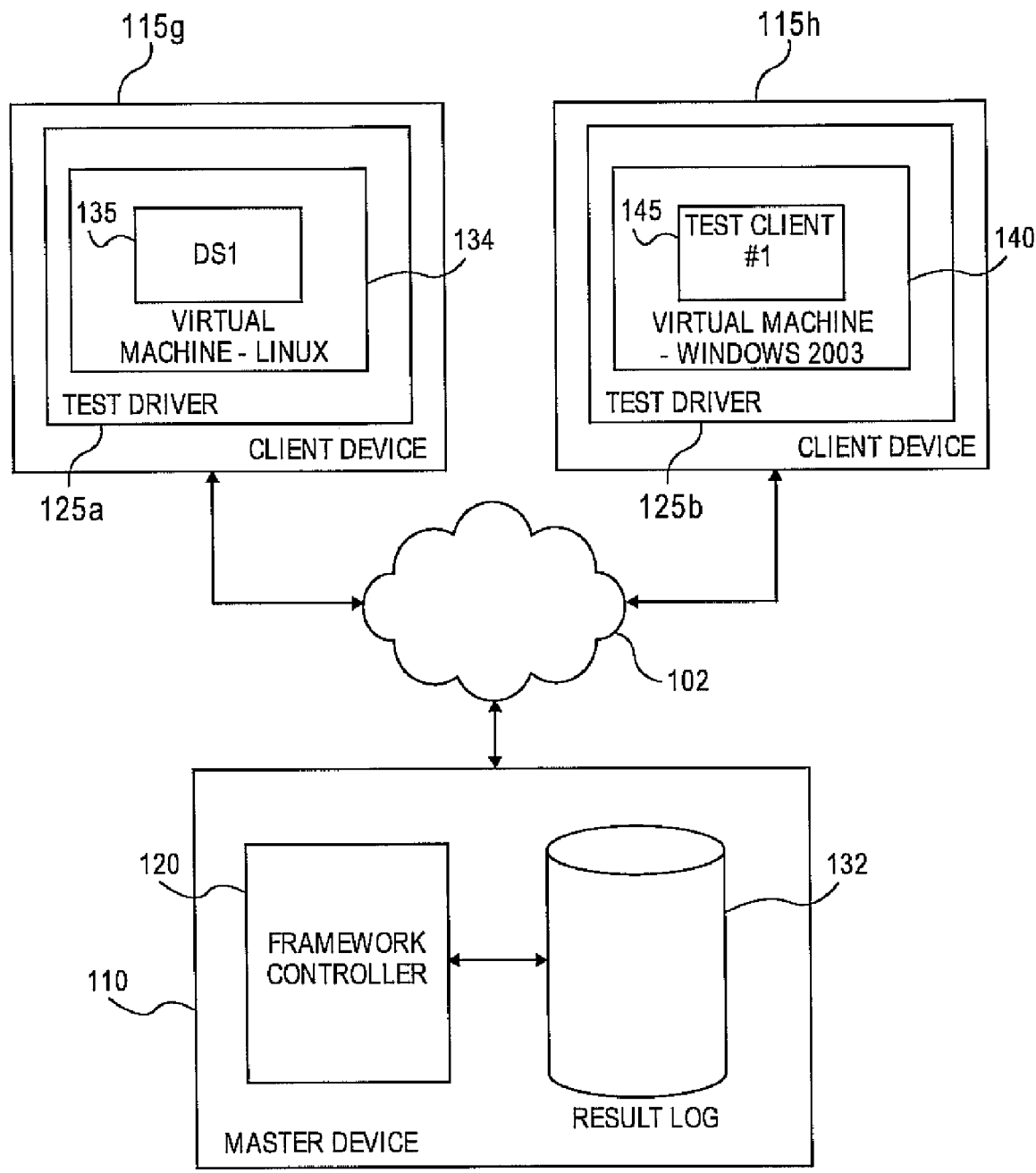
FIG. 2B-2D are block diagrams illustrating exemplary operations of the test framework according to the first exemplary test scenario file.

Referring to FIGS. 2A-2D, exemplary operations of the test framework 100 according to a first exemplary test scenario file will be discussed. As discussed above, the framework controller 120 is driven by a test scenario file 111 listing all of the test cases, how the test cases are to be executed, and on which particular client devices parts of the test case will be executed. A first exemplary test scenario file 200 is shown in FIG. 2A. The test scenario file 200 describes a test case in which operation of a software application for implementing a Directory Server, which will be referred to here as a Directory Server, is tested across multiple operating systems in an inter-machine environment. As shown, the test scenario file 200 can be a non-coding text file. The text has a file name of "DIRECTORY-TEST-PLAN1.txt" as shown.

As shown in FIG. 2B, the master device 110 can include the framework controller 120 associated with the test framework 100 as discussed above with respect to FIG. 1A as well as a results log 132 for storing, for example, the results file 113 as well as test related data. Of course, the results log 132 can be part of the test framework 100 rather than a separate logical element. The master device 110 can have an indirect connection such as a network connection 102 with client devices 115g, 115h. The client devices 115g, 115h includes test drivers 125a, 125b associated with the test framework 100 as discussed above with respect to FIG. 1A.

The test scenario file 200 can be input into the framework controller 120, or, that is, the test can be run by the test framework 100 by typing a command such as "test framework DIRECTORY-TEST-PLAN1.txt on, for example, the Unix command line if the master device 110 is a UNIX box. After the test scenario file 200 is input into the framework controller 120, the test controller 122 sends control signals to the test drivers 125a, 125b to perform their allocated portions of the test case. Particularly, as shown in FIG. 2B, in response to the controls signals, the test driver 125a creates a first VM 134 having 500 MB of disk space and names it VM1, and installs the Linux operating system on the first VM 134. The test driver 125a installs the Directory Server 135 on the first VM 134 and names it DS1. The test driver 125b creates a second VM 140 on the client device 125b and names it VM2, and installs the Windows 2003 operating system on the second VM 140. The test driver installs a test client #1 145 on the second VM 140. The test client #1 145 will be a client application of the Directory Server 135.

Figure 2C:
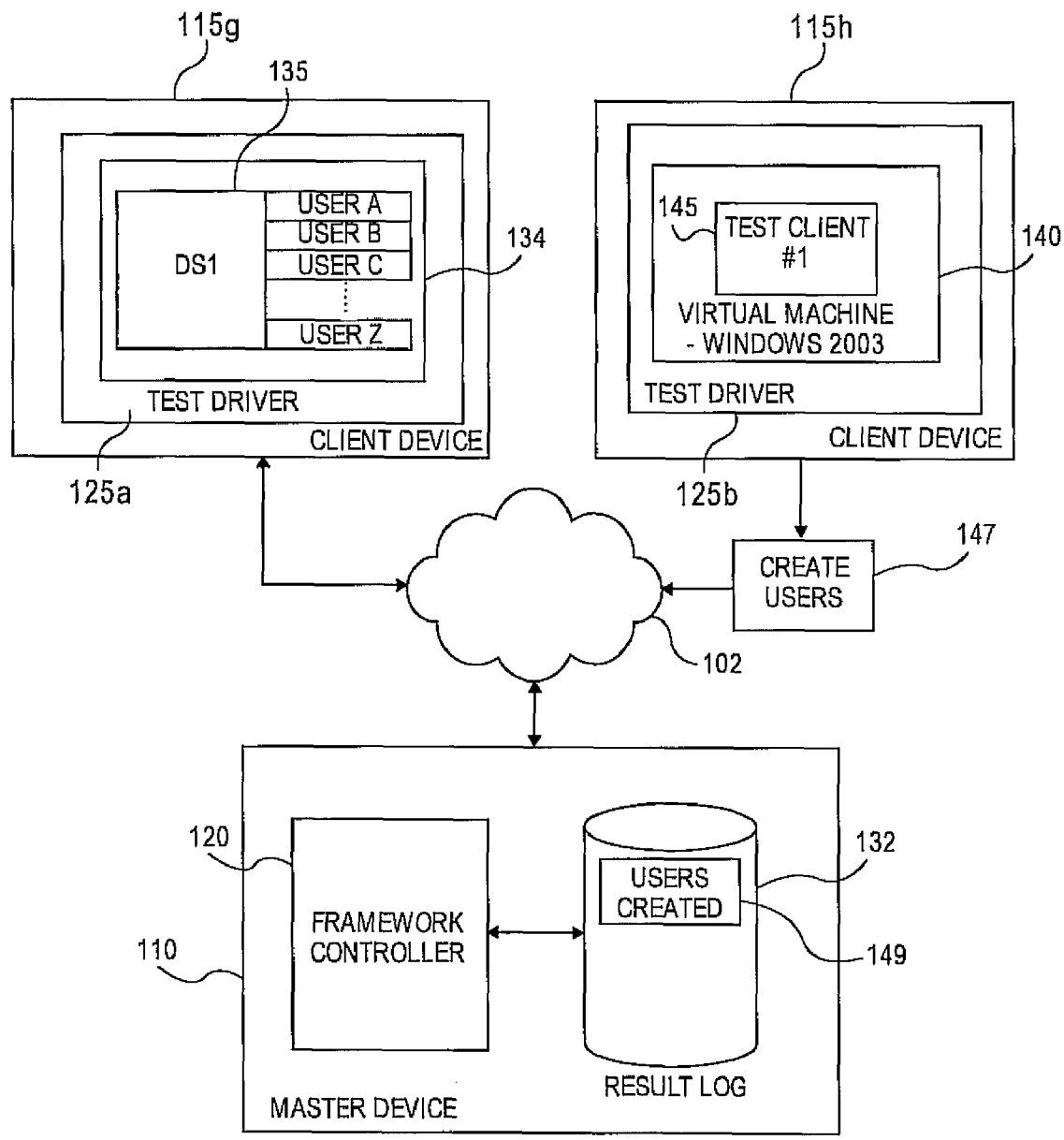

Referring to FIG. 2C, in accordance with the portion of the test allocated to the test driver 125b, the test client #1 145 attempts to send a request 147 to the Directory Server 135 to create 1000 users, which is shown as "CREATE USERS." In response, the Directory Server 135 creates the 1000 users, which are shown as "USER A, USER B, USER C . . . USER Z." The framework controller 120 can collect a result 149 indicating successful user creation of the users by the Directory Server 135 and store the result in the results log 132, which is shown as "USERS CREATED."

Figure 2D:
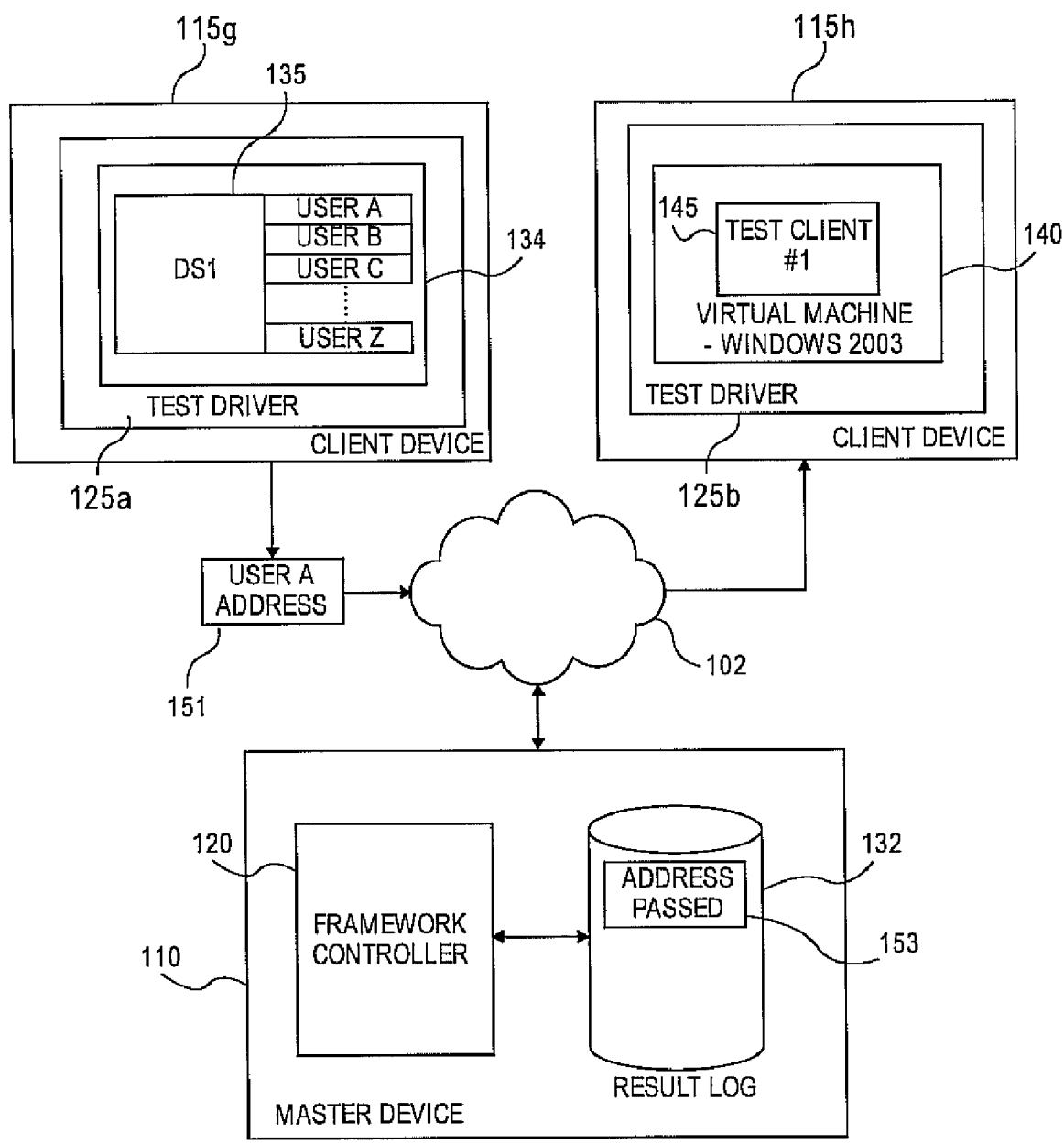

Referring to FIG. 2D, the test client #1 145 attempts to obtain an address for a particular user such as, for example, USER A. The Directory Server 135 sends a reply 151 including the address information shown as "USER A ADDRESS." The framework controller 120 can collect a result 147 indicating successful transmission of the user address by the Directory Server 135 and store the result 153 in the results log 132 as shown as "ADDRESS PASSED." Thereby, the test framework 100 can determine if the Directory Server 135 executes properly across the multiples operating system platforms and over the network connection 102.

It should be noted that the test could not be executed properly if, for example, the test client #1 145 attempted to send the request 147 to the Directory Server 135 to create 1000 users before the test driver 125a had installed the Directory Server 135 in the first VM 134. However, the test part synchronizer 128 at the framework controller 120 described above with reference to FIG. 1B can synchronize the execution of the respective test drivers 125a, 125b to prevent, for example, sending of the request 147 before creation of the Directory Server 135 on the first VM 134.

Figure 3B:
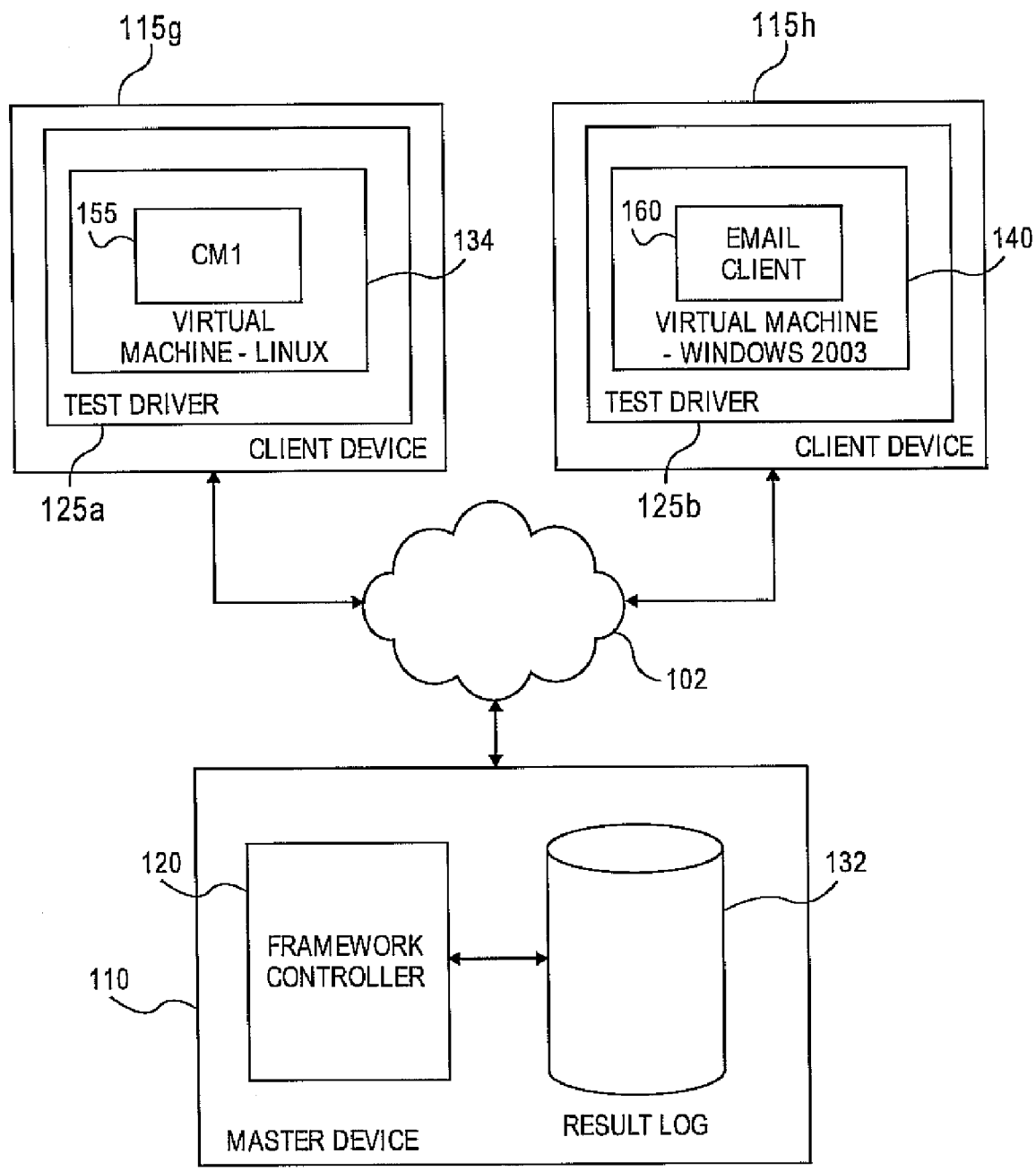
FIG. 3B-3D are block diagrams illustrating exemplary operations of the test framework according to the second exemplary test scenario file.

Referring to FIGS. 3A-3D, exemplary operations of the test framework 100 according to a second exemplary test scenario file 300 will be discussed. The second exemplary test scenario file 300 is shown in FIG. 3A. The test scenario file 300 describes a test case in which operation of a software application for implementing a Certificate Manager, which will be referred to here as a Certificate Manager, is tested across multiple operating systems in an inter-machine environment. As shown, the test scenario file 300 can be a non-coding text file. The text has a file name shown as "CM-TEST-PLAN1.txt." The test scenario file 300 can be input into the framework controller 120, or, that is, the test can be run by the test framework 100 by typing a command such as "test framework CM-TEST-PLAN1.txt on, for example, the Unix command line if the master device 110 is a UNIX box.

Referring to FIG. 3B, after the test scenario file 300 is input into the framework controller 120, the test controller 122 of the framework controller 120 sends control signals to the test drivers 125a, 125b to perform their allocated portions of the test case. Particularly, in response to the controls signals, the test driver 125a creates a first VM 134 having 500 MB of disk space and names the VM 134 "VM1", and installs the Linux operating system on the first VM 134. The test driver 125a installs the Certificate Manager 155 on the first VM 134 and names the Certificate Manager 155 "CM1." The test driver 125b creates a second VM 140 and names it "VM2", and installs the Windows 2003 operating system on the second VM 140. The test driver installs an email client application 160 on the second VM 140.

Figure 3C:
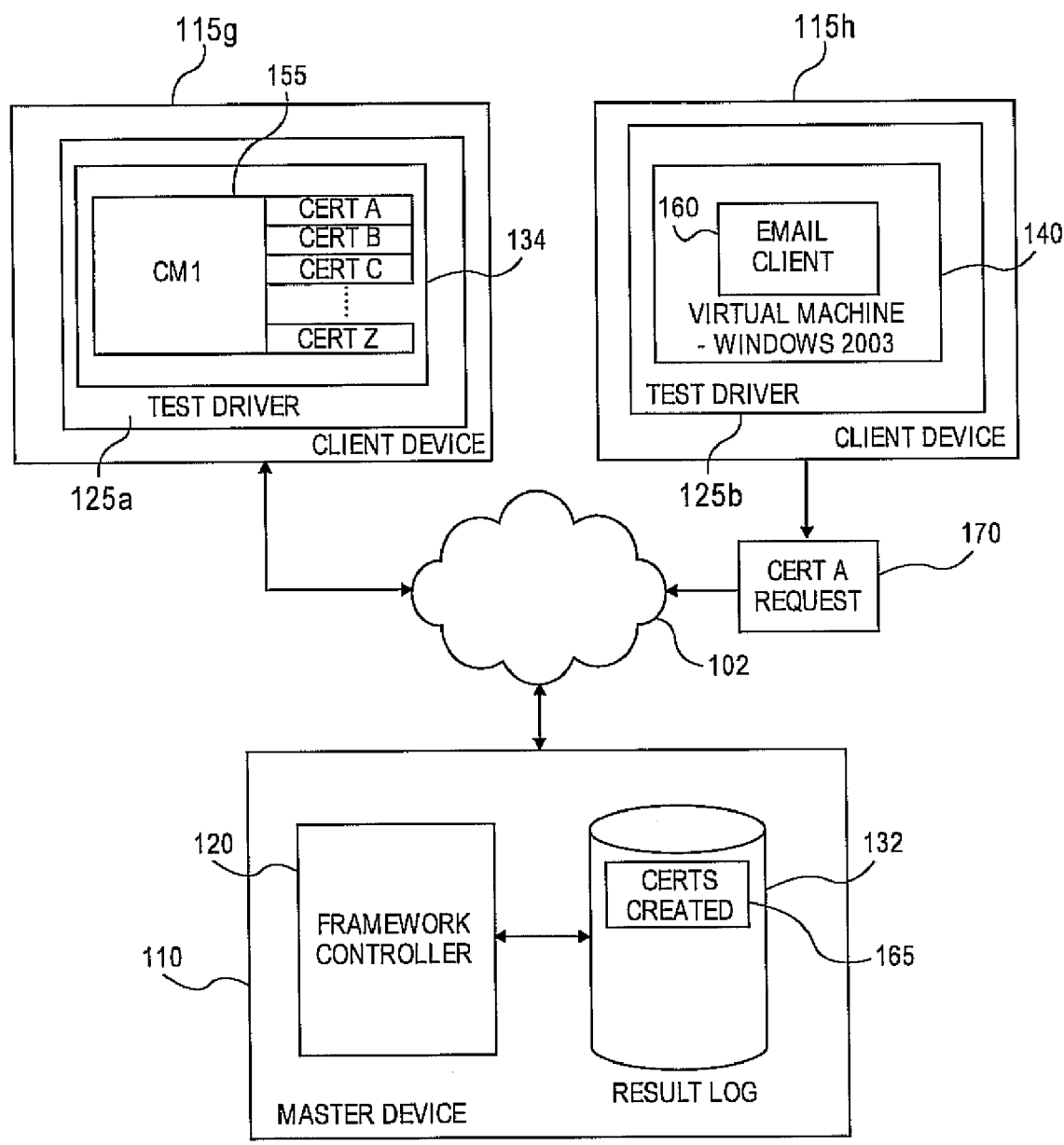

Referring to FIG. 3C, the Certificate Manager 155 creates a number of certificates for users, which are shown as "CERT A, CERT B, CERT C . . . CERT Z." The framework controller 120 can collect data indicating successful creation of the certificates by the Certificate Manager 155 and store a result 165 based upon the collected data in the results log 132, which is shown as "CERTS CREATED." The email client application 160 attempts to send a certificate request 170 to the Certificate Manager 155 to obtain a certificate for a particular user, which is shown as "CERT A REQUEST."

Figure 3D:
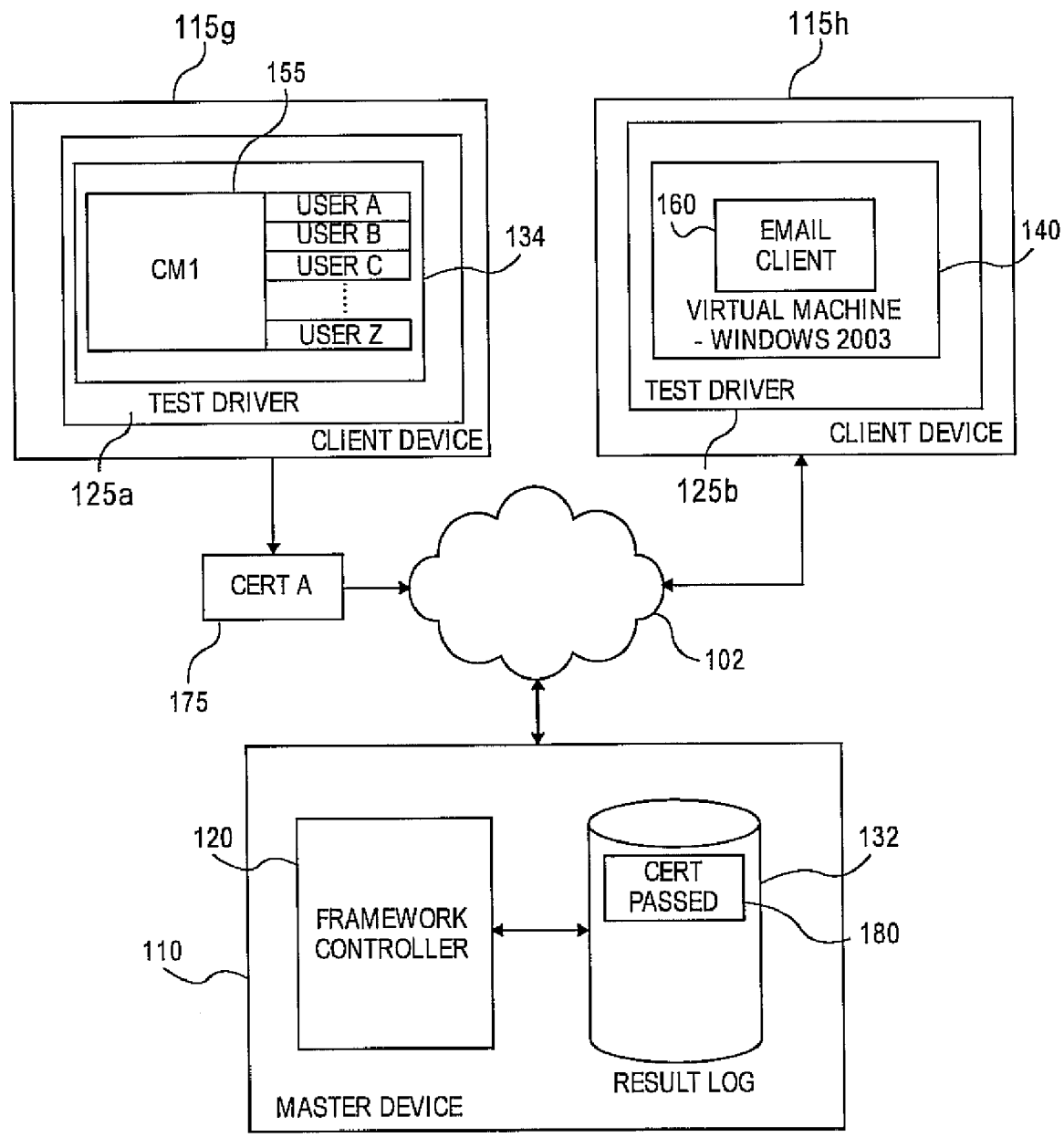

Referring to FIG. 3D, the Certificate Manager 155 sends a reply 175 including the certificate requested by the email client application 160. The reply 175 is shown as "CERT A." The framework controller 120 can collect a result 180 indicating successful transmission of the certificate by the Certificate Manager 155 and store the result in the results log 132 as shown as "CERT PASSED." Thereby, the test framework 100 can determine if the Certificate Manager 155 executes properly across the multiples operating system platforms and over the network connection.

Figure 4:
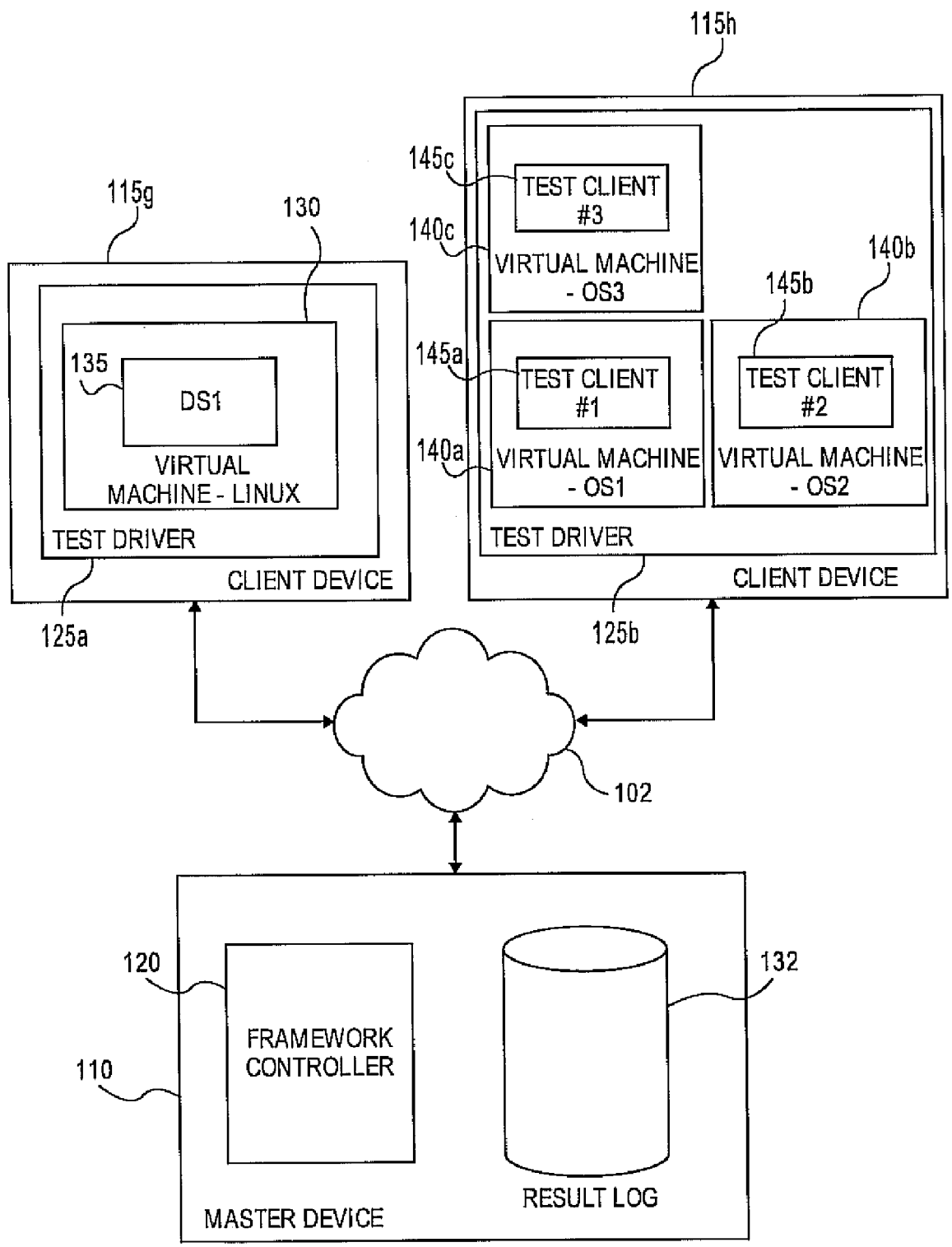
FIG. 4 is a block diagrams illustrating exemplary operations of the test framework according to a third exemplary test scenario file.

Referring to FIG. 4, exemplary operations of the test framework 100 according to a third exemplary test scenario file will be discussed. In the first exemplary test scenario file 200 shown in FIG. 3A, only one VM was installed in the client device 115h. However, the test framework 100 is capable of creating a plurality of VMs on one client device 115. Particularly, in the present example, the test driver 125a creates a first VM 134 having 500 MB of disk space and names the VM 134 "VM1", and installs the Linux operating system on the first VM 134. The test driver 125a installs the Directory Server 135 on the first VM 134 and names the Directory Server 135 "DS1." The test driver 125b can create a second VM 140a and name it "VM2", a third VM 140b and name it "VM3", and a fourth VM 140c and name it "VM4", and install different operating systems for the VMs 140a, 140b, 140c. The test driver installs a test client #1 145a on the second VM 140a, a test client #2 145b on the second VM 140b and a test client #3 145c on the second VM 140c. The test clients are all client applications of the Directory Server 135. Thereby, the test framework 100 can determine if the Directory Server 135 executes properly across the multiples operating system platforms and over the network connection.

Figure 5:
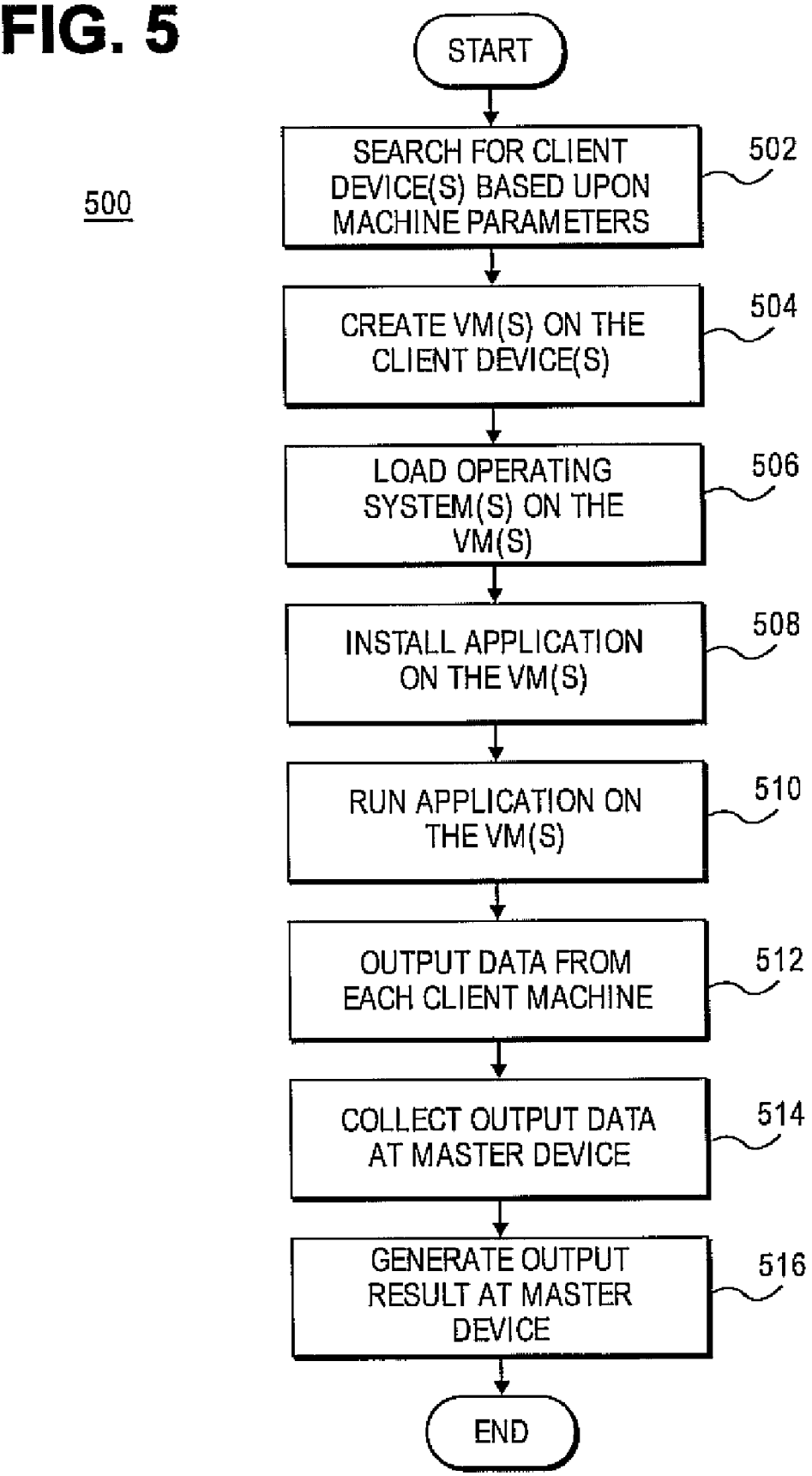
FIG. 5 is a flow chart illustrating an exemplary operation of the test framework.

Referring to FIG. 5, a flow chart illustrating a process 500 for testing an application within the test framework 100 will be discussed. At 502, the master device 110 searches for particular ones of the plurality of client devices 115 that will be part of the inter-machine environment. For example, the framework controller 120 can search for particular client devices having a particular hardware configuration necessary to support operation in accordance with a VM_HARDWARE_SPECIFICATION primitive in the test scenario file 111 expressing machine parameters.

At 504, the master device 110 creates a plurality of VMs on the particular client devices 115. Particularly, the framework controller 120 can send control signals to the test drivers 125 of the particular client devices to thereby cause the test drivers to create and activate VMs. The hardware specification of the VM can be set according to a CREATE_VM primitive for creating the VM on the one of the plurality of client devices 115 and a VM_HARDWARE_SPECIFICATION primitive for setting a hardware specification of the VM in the test scenario file 111.

At 506, the master device 110 installs operating systems in the VMs. Particularly, the framework controller 120 can send control signals to the test drivers 125 to thereby cause the test drivers 125 to load operating systems specified in VM_OPERATING_SYSTEM primitives of the test scenario file 111 in the VMs.

At 508, the master device 110 installs the application to be tested in the VMs. Particularly, the framework controller 120 can send control signals to the test drivers 125 to thereby cause the test drivers 125 to install the application in the VMs in accordance with an application primitive in the test scenario file 111. At 510, the test drivers 125 execute operation of the application according to the test scenario file 111 to generate data. At 512, the test drivers 125 periodically output data regarding application execution. At 514, the framework controller 120 collects the data from the test drivers 125. At 516, the framework controller 120 generates the results file 113 as an output result based upon the data collected from each of the plurality of client devices 115.

Figure 6:
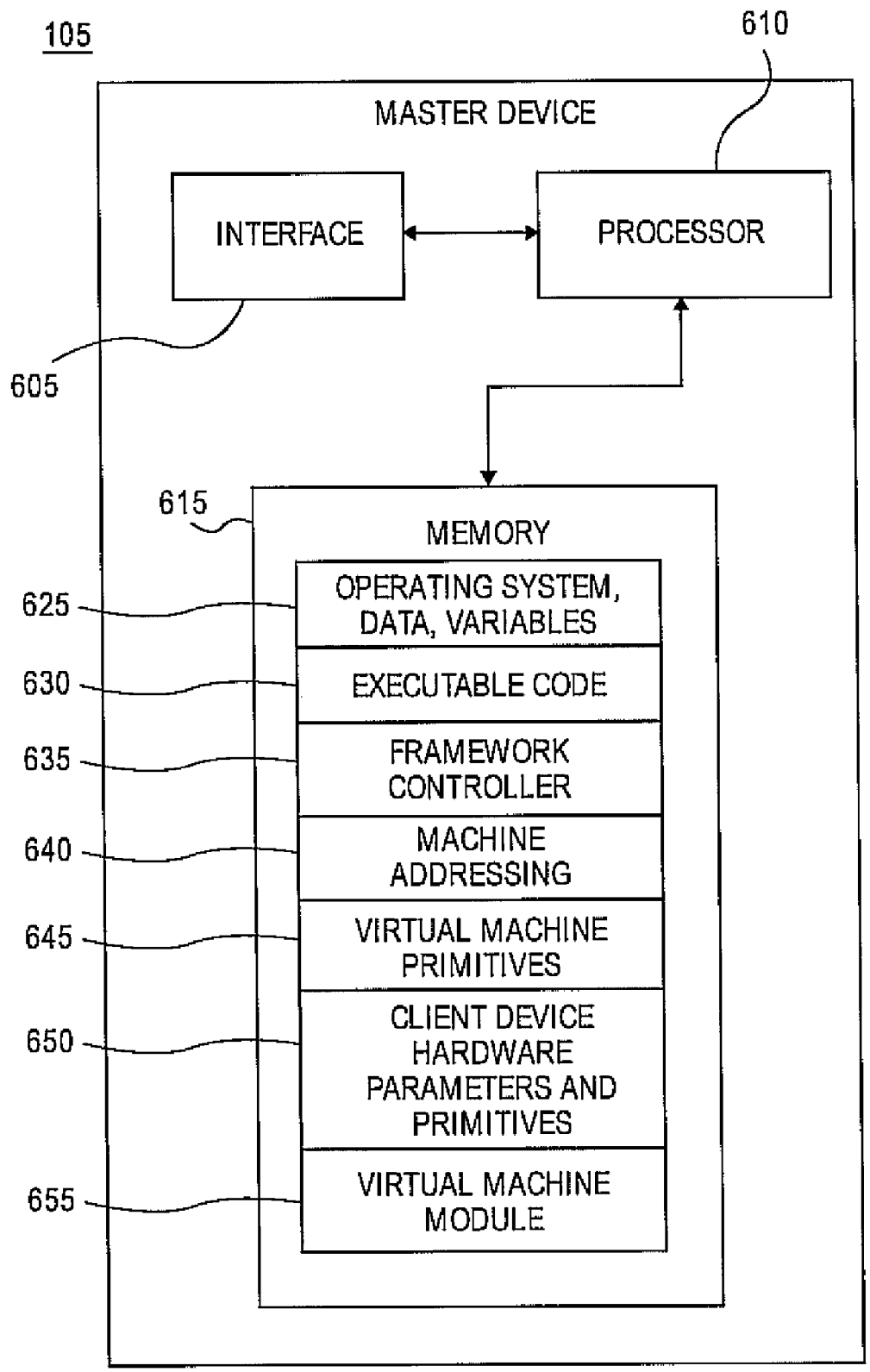
FIG. 6 is a block diagram illustrating portions of a master device.

Referring to FIG. 6, exemplary portions of the master device 105 will be discussed. The master device 105 includes an interface 605, a processor 610 and a memory 615 as well as optionally known peripherals for interfacing with a user, such as a display and input devices (not illustrated). The interface 605 is generally for providing an interaction between the hardware of the connection with the test drivers 125 of the client devices 115 and the hardware of the master device 105, such as, for example, the processor 610. The interface 610 may also be utilized in connection with another computer by known USB technology. The processor 610 can be one of a variety of different processors including general purpose processors, custom processors, controllers, compact eight-bit processors or the like. The memory 615 can be coupled to the processor 610 and can be one or a combination of a variety of types of memory such as random access memory (RAM), read only memory (ROM), flash memory, dynamic RAM (DRAM), a programmable ROM (PROM), flash memory, and/or an EEPROM. The memory 615 may include multiple memory locations and store an operating system, data and variables 625 and executable code 630. Further, the memory 615 can include instructions such as computer programs associated with the test framework 100 which can direct the processor 610 in controlling the operation of the master device 105. The computer programs can include, for example, the framework controller 635, machine addressing 640, VM primitives 645, client device hardware parameters and primitives 650, and a VM module 655. These are described in more detail below.

The framework controller 635 instructions are for implementing the framework controller 120 shown in FIG. 1B and discussed above. The machine addressing 640 instructions are for maintaining addresses of client devices such as, for example, Internet Protocol addresses to ensure proper data communication.

The VM primitives 645 instructions are for reading VM primitives in the test scenario file 111 and sending control signals to the test drivers at the client devices to execute allocated portions of a test case accordingly. The VM primitives 645 can include, for example, a CREATE_VM primitive for creating a VM on one of the plurality of client devices, a VM_HARDWARE_SPECIFICATION primitive for setting a hardware specification of the VM, an application primitive for specifying an application to be installed on the VM, a SAVE_VM_STATE primitive for saving a state of the VM, and a VM_OPERATING_SYSTEM primitive for specifying an operating system to be installed on the VM, a DESTROY_VM primitive for destroying the VM, and a RESTORE_VM_STATE primitive for restoring the VM to an active state based upon the saved state.

The machine hardware parameters and primitives 650 are for reading hardware primitives in the test scenario file specifying a certain hardware specification for a client device 115 and maintaining parameters regarding the hardware specification of each of the client devices 115 in the inter-machine environment such as, for example, a processor type, memory capacity, etc. The VM module 655 can be, for example, a Xen or VMware module, but is generally any module capable of creating one or more VMs.

Figure 7:
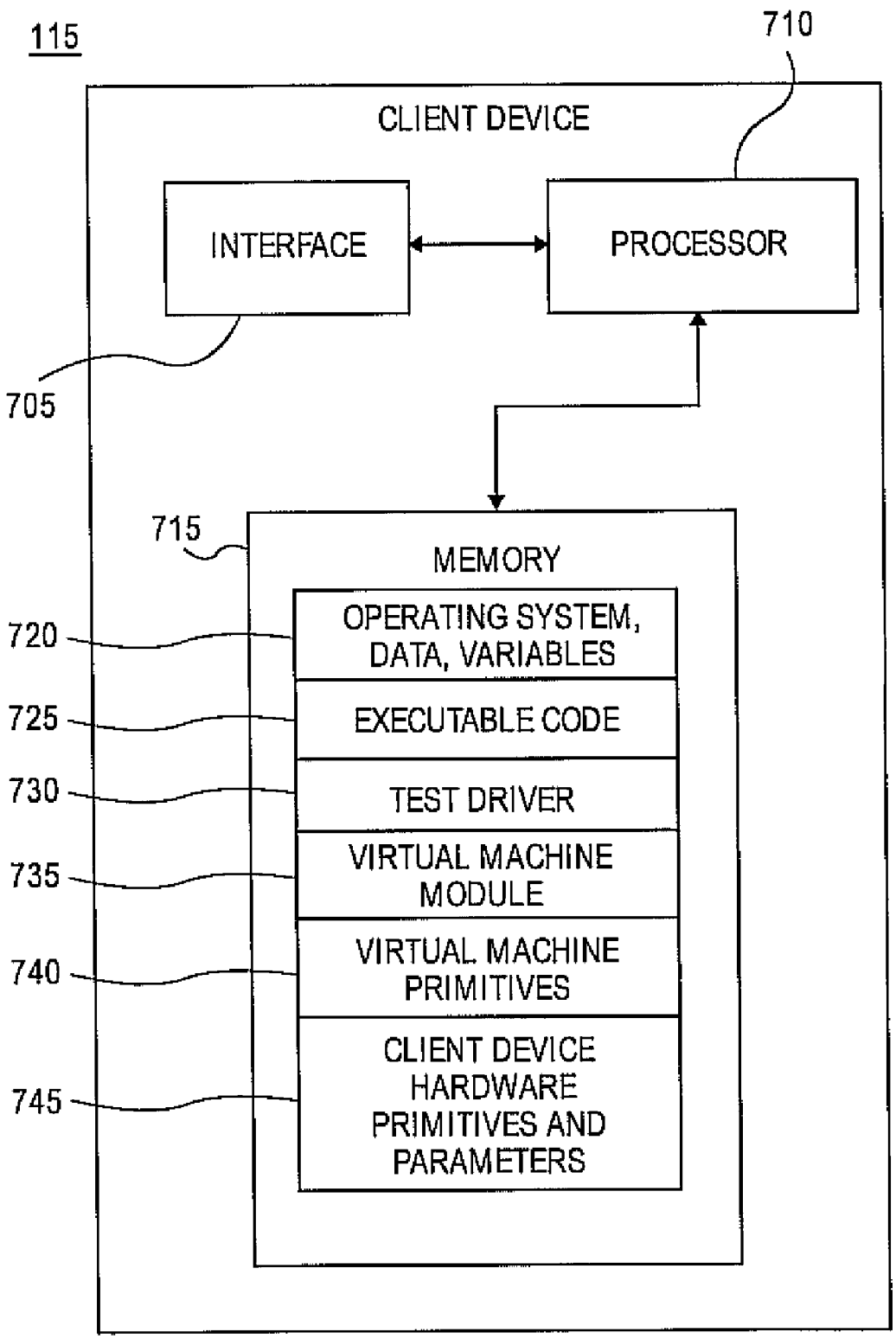
FIG. 7 is a block diagram illustrating portions of a client device.

Referring to FIG. 7, an exemplary client device 115 will be discussed. The client device 115 includes an interface 705, a processor 710 and a memory 715. The interface 705 is generally for providing the indirect or direct connection with the framework controller 120 of the master device 105 as well as with the test driver 125 of other client devices 115. The processor 710 can be one of a variety of different processors including general purpose processors, custom processors, controllers, or the like such as a 64 bit processor, a 32 bit processor, or a dual-core processor. The memory 715 can be one or a combination of a variety of types of memory such as RAM, ROM, flash memory, DRAM, PROM, flash memory, and/or an electrically erasable, programmable ROM (EEPROM) or the like. The memory 715 can include a basic operating system, data, and variables 720 and executable code 725. Further, the memory 715 can include computer programs (or instructions) associated with the test framework 100 such as those discussed below which can direct the processor 710 in controlling the operation of the client device 115. The computer programs can include, for example, a test driver 730 associated with the test framework 100, the VM module 735, VM primitives 740, and client device hardware primitives and parameters 745. These are described in more detail below.

The test driver 730 instructions are for implementing the test driver 125 shown in FIG. 1A and discussed above. The VM module 735 can be, for example, a Xen or VMware module, but is generally any module capable of creating and/or activating one or more VMs on the client device 115. The VM primitives 740 are instructions for creating and configuring a VM according to the control signals received from the master device 105. The VM primitives 740 can include, for example, a VM_HARDWARE_SPECIFICATION primitive for setting a hardware specification of the VM, a SAVE_VM_STATE primitive for saving a state of the VM, and a VM_OPERATING_SYSTEM primitive for specifying an operating system to be installed on the VM, a DESTROY_VM primitive for destroying the VM, and a RESTORE_VM_STATE primitive for restoring the VM to an active state based upon the saved state. The client device hardware parameters and primitives 745 are instructions for maintaining and communicating the hardware specification of the client device 700.

Any of the above described methods and procedures can be embodied as instructions stored on a computer readable medium, which includes storage devices and signals, in compressed or uncompressed form. Exemplary computer readable storage devices include conventional computer system RAM, ROM, EPROM, EEPROM, and magnetic or optical disks or tapes. Exemplary computer readable signals, whether modulated using a carrier or not, are signals that a computer system can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

It should also be understood that although various logical groupings of blocks and elements were described above, different realizations may omit one or more of these logical groupings. Likewise, in various realizations, blocks may be grouped differently, combined, or augmented. Furthermore, one or more blocks including those identified herein as optional can be omitted from various realizations. For example, the present description may describe or suggest a collection of data and information. One or more embodiments can provide that the collection of data and information can be distributed, combined, or augmented, or provided locally and/or remotely.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of testing an application within a test framework, the method comprising:
   receiving a test scenario file specifying a configuration of one or more virtual machines (VMs) for testing the application;
   searching for one or more client devices having a hardware specification necessary to support operation of the one or more VMs according to the test scenario file;
   creating the one or more VMs on the one or more client devices according to the test scenario file;
   installing the application on at least one of the one or more VMs;
   executing the application on the at least one of the one or more VMs according to the test scenario file to generate an output result; and
   collecting data associated with the output result.

2. The method of claim 1, wherein the creating of the one or more VMs comprises setting a hardware configuration of each of the one or more VMs.

3. The method of claim 1, wherein the hardware configuration necessary to support operation is specified by a VM_HARDWARE_SPECIFICATION primitive.

4. The method of claim 1, wherein the test scenario file comprises a non-coding format text file.

5. The method of claim 1, further comprising installing a different operating system on at least one of the one or more VMs as specified in the test scenario file.

6. The method of claim 1, further comprising saving a state of one of the one or more VMs.

7. The method of claim 1, further comprising:
saving a state of one of the one or more VMs; and
restoring the one of the one or more VMs on one of the one or more client devices based upon the saved state.

8. The method of claim 1, wherein the creating of the one or more VMs on the one or more client devices comprises activating at least one of the one or more VMs on at least one of the one or more client devices.

9. The method of claim 1, further comprising destroying one or more of the one or more VMs.

10. The method of claim 1, further comprising:
installing a client application on one of the one or more VMs; and
executing the client application on the one of the one or more VMs according to the test scenario file to generate a output client result; and
collecting data associated with the output client result.

11. A test framework for testing an application, the test framework comprising:
one or more client devices with a test driver installed thereon and connected to a master device;
a framework controller installed on the master device and configured to search for one of the one or more client devices having a hardware specification necessary to support operation according to a test scenario file, and to send control signals to the test driver to execute operations at the one of the one or more client devices according to a configuration specified in the test scenario file, wherein the configuration specified in the test scenario file comprises:
a set of primitives for creating a virtual machine (VM) for testing the application on the one of the one or more client devices and controlling operation of the VM; and
an application primitive for specifying the application to be installed on the VM.

12. The test framework of claim 11, wherein the set of primitives for creating the VM includes one or more of: a CREATE_VM primitive for creating the VM on the one of the one or more client devices, and a VM_HARDWARE_SPECIFICATION primitive for setting a hardware specification of the VM, a SAVE_VM_STATE primitive for saving a state of the VM.

13. The test framework of claim 11, wherein the set of primitives for creating the VM includes one or more of: a CREATE_VM primitive for creating the VM on the one of the one or more client devices, a VM_HARDWARE SPECIFICATION primitive for defining a hardware specification of the VM, a SAVE_VM_STATE primitive for saving a state of the VM, and a RESTORE_VM_STATE primitive for restoring the VM based upon the saved state.

14. The test framework of claim 11, wherein the test scenario file comprises a non-coding format text file.

15. The test framework of claim 11, wherein the test driver is configured to execute the application installed on the VM to generate an output result, and wherein the test framework further comprises a data collection module for collecting data associated with the output result from the VM.

16. A master device for testing an application within a test framework, the master device comprising:
an interface for connecting with a test driver at one or more client devices; and
a processor coupled to the interface, the processor configured to:
receive a test scenario file specifying a configuration of a virtual machine (VM) for testing the application;
search for one of the one or more client devices having a hardware specification necessary to support operation of the VM according to the test scenario file;
create the VM on the one of the one or more client devices according to the test scenario file;
install the application on the VM;
execute the application on the VM according to the test scenario file to collect execution data; and
generate an output result based upon the collected execution data.

17. The master device of claim 16, wherein the processor is further configured to save a state of the VM.

18. The master device of claim 16, wherein the processor is further configured to:
save a state of the VM; and
restore the VM based upon the saved state.

19. The master device of claim 16, wherein:
the test scenario file comprises a non-coding format text file; and
the processor is further configured to read the non-coding format text file to execute the application.

* * * * *